United States Patent [19]

Evers

[11] Patent Number: 5,628,214
[45] Date of Patent: *May 13, 1997

[54] BICYCLE LOCK

[75] Inventor: Ridgely C. Evers, Healdsburg, Calif.

[73] Assignee: Bolt Security Products, Inc., Healdsburg, Calif.

[*] Notice: The term of this patent shall not extend beyond the expiration date of Pat. No. 5,564,297.

[21] Appl. No.: 369,755

[22] Filed: Jan. 6, 1995

[51] Int. Cl.⁶ .................................................. B62H 5/16
[52] U.S. Cl. .................................................. 70/227; 70/233
[58] Field of Search .......................... 70/38 C, 233, 70/225–227

[56] References Cited

U.S. PATENT DOCUMENTS

| | | | |
|---|---|---|---|
| 518,323 | 4/1894 | Lamb et al. | 70/227 |
| 542,507 | 7/1895 | Tafel | 70/227 |
| 556,976 | 3/1896 | Herr | 70/227 |
| 570,521 | 11/1896 | Turton | 70/227 |
| 583,638 | 6/1897 | Thomsen | 70/227 |
| 587,793 | 8/1897 | Chevalier | 70/227 |
| 603,780 | 5/1898 | Wright | 70/227 |
| 616,051 | 12/1898 | Badoni | 70/227 |
| 654,672 | 7/1900 | Rich | 70/227 |
| 981,359 | 1/1911 | Balwick | 70/227 |
| 1,137,691 | 4/1915 | Baumann | 70/227 |
| 1,194,034 | 8/1916 | Koch | 70/227 |
| 1,267,177 | 5/1918 | Brooks | 70/227 |
| 1,354,896 | 10/1920 | De Vries | 70/227 |
| 1,402,725 | 1/1922 | Pippen | 70/227 |
| 1,687,697 | 10/1928 | Soullière | 70/227 |
| 1,967,926 | 7/1934 | Dacosta | 70/227 |
| 2,099,606 | 11/1937 | Holsen | 70/227 |
| 2,232,310 | 2/1941 | Boyler | 70/227 |
| 2,366,863 | 1/1945 | Lippow | 70/227 |
| 2,479,849 | 8/1949 | Mangan | 70/227 |
| 2,532,864 | 12/1950 | Theodorackis | 70/227 |
| 3,988,910 | 11/1976 | Widen | 70/227 |
| 4,028,916 | 6/1977 | Pender | 70/233 |
| 4,180,998 | 1/1980 | Hellman | 70/227 |
| 4,459,833 | 7/1984 | Waterkamp et al. | 70/227 |
| 4,571,965 | 2/1986 | LeRoux | 70/233 X |
| 5,069,049 | 12/1991 | Shieh | 70/227 |
| 5,092,142 | 3/1992 | Zane et al. | 70/233 X |

FOREIGN PATENT DOCUMENTS

| | | | |
|---|---|---|---|
| 404529 | 12/1909 | France | 70/233 |
| 905252 | 11/1945 | France | 70/233 |
| 3127468 | 1/1983 | Germany | 70/233 |
| 277348 | 12/1927 | United Kingdom | 70/227 |

Primary Examiner—Lloyd A. Gall
Attorney, Agent, or Firm—Burns, Doane, Swecker & Mathis, L.L.P.

[57] ABSTRACT

The invention relates to a bicycle lock which passes through the spokes of a bicycle wheel to prevent the bicycle from being ridden. A preferred embodiment of the invention includes a locking bracket positioned on a first frame member at one side of the wheel and a receiving bracket positioned on a second frame member on an opposite side of the wheel from the locking bracket. A lock pin is provided which extends from one bracket to the other through the spokes of the bicycle wheel. The lock pin is positioned in a through hole of the receiving bracket and in a blind hole in the locking bracket. The locking bracket has a locking mechanism for locking the lock pin in place.

23 Claims, 4 Drawing Sheets

BICYCLE LOCK

BACKGROUND OF THE INVENTION

1. Field of the Invention

The present invention relates to a bicycle lock and more particularly to a bicycle lock which is adapted to extend through the spokes of a bicycle wheel and be mounted on the bicycle frame and employ the bicycle frame as an integral part of the locking structure.

2. Description of the Related Art

Bicycle locks have ranged in design from simple extended-hasp padlocks to chain and cable locks and more recently to locks constructed in U-shapes and the like which are separable from the bicycle. Use of such locks typically involves locking the bicycle to a stationary object such as a bicycle rack. Such locks, and especially the popular U-shaped locks, are heavy and cumbersome. They are a nuisance when not in use. When a U-lock is not in use the bicyclist must either mount it in an auxiliary holder bolted to the bike frame (which adds additional weight) or carry the lock as he or she cycles.

It has also been suggested to provide a lock which employs a bar or rod which extends between the spokes of a front or rear wheel. In such locks, the bar is generally attached or locked in some manner to two frame members of the bicycle on which the wheel is mounted. A known manner of attaching the bar to the frame members is to attach mounting members to the frame members on either side of the wheel and to attach the bar to the two mounting members. The bar may be attached to the mounting members by positioning the bar in apertures extending through the mounting members and locking the bar in place with a locking mechanism. A challenge in making such a bicycle lock which is permanently mounted on a bicycle is to make the lock strong and theft proof while at the same time making the lock lighter in weight than the U-locks of the art.

This type of lock is susceptible of improvements in that the lock can be broken by sawing through either of the mounting members, by removing the mounting members from the frame members and by prying or dislocating the lock from its original position to one where the lock is defeated. Also, with locks of this type it can be relatively easy to break the locking mechanism by pounding the bar out of the apertures in the brackets.

In an earlier patent application I described a lock which was a substantial improvement over locks described previously. This lock was characterized by having an elongated cylindrical pin, a first bracket and a second bracket. The first bracket had securing means for removably securing the first bracket to one of two outwardly splayed frame tubes of a bicycle at a point spaced from the rear axle of the bicycle. The second bracket had a securing means for removably securing the second bracket to the other of the two seat tubes of the bicycle at the same spacing from the rear axle. The first bracket had a first cylindrical aperture disposed parallel to the rear axle of the bicycle when the lock was installed on the bicycle. The first aperture was sized to receive the elongated cylindrical pin with the pin spanning between the two brackets and having an end received in a second cylindrical aperture in the second bracket. A locking means was provided in the first bracket for lockably engaging the cylindrical pin to prevent removal of the pin from the first bracket. The second cylindrical aperture in the second bracket was blinded on an outer end to prevent access to the end of the cylindrical pin when the pin was positioned in the blind aperture. In certain embodiments the pin was elongated and shaped to fasten the pin and its associated lock body and bicycle to a post or other immobilizing object. In this configuration this lock was somewhat susceptible to defeat by attacking the connection between the pin and the first bracket. Their rigid connection allowed great force to be applied to this junction.

OBJECTS AND SUMMARY OF THE INVENTION

The bicycle lock according to the preferred embodiment of the invention addresses the disadvantages of the known locks by providing a light weight and strong lock which is not susceptible to being damaged or destroyed in the foregoing ways.

The bicycle lock according to the present invention is characterized by locking across two elements of the bicycle frame in a manner in which the bicycle frame becomes an integral member of the locking structure. The lock is further characterized by being physically more robust than the bicycle frame such that if a lock-defeating force is applied to the lock it will have the effect of distorting or damaging the bicycle frame. This will impart an extra measure of protection. The typical bicycle thief is interested in stealing a bicycle in good rideable condition. When it appears that a theft attempt is likely to damage the bicycle frame the typical thief will abandon his or her efforts and move on to another target.

Like my prior lock, the preferred embodiment of the present bicycle lock includes an elongated cylindrical pin, a first bracket and a second bracket. In the present lock the first bracket has securing means for securing the first bracket to one of two outwardly splayed frame tubes of a bicycle at a point spaced from the rear axle of the bicycle. The second bracket has a securing means for securing the second bracket to the other of the two seat tubes of the bicycle at the same spacing from the rear axle. The first bracket has a first cylindrical aperture disposed parallel to the rear axle of the bicycle when the lock is installed on the bicycle. The first aperture is sized to receive the elongated cylindrical pin with the pin spanning between the two brackets and having an end received in a second cylindrical aperture in the second bracket.

A locking means is provided in the second bracket for lockably engaging the cylindrical pin to prevent removal of the pin from the second bracket. The second cylindrical aperture in the second bracket is blinded on an outer end to prevent access to the end of the cylindrical pin when the pin is positioned in the blind aperture. The elongated cylindrical pin typically extends outwardly beyond the first aperture in the first bracket. This extension can include a cap or head sized to prevent the end of the pin from being pulled through the first bracket. In another and preferred embodiment this extension of the elongated pin can be bent into a crook or "J" to allow the extended end of the pin to be fastened around a post, bicycle rack or other immobilizing object when the pin is locked in place between the two brackets.

In either embodiment any attempt to pry upon the lock will apply force across the two bicycle frame members. Any attempt to pull the pin out of the lock in the second bracket will, by design, cause a force to be applied across the two brackets and the frame members to which they are attached. If, as is the case, the two brackets, the pin and the lock mechanism are stronger than the frame to which the two brackets are attached, this force will have a frame-distorting and ultimately frame-destroying effect which will be noted by the thief and discourage the thief's further efforts.

The cylindrical elongated pin when in locked engagement with the second bracket blocks access to the first and second securing means so that the first and second brackets can not be removed.

This lock has been described with reference to a cylindrical pin, that is a pin with a circular cross-section, and to cylindrical receiving apertures and the like. This particular configuration is preferred. In the case of the headed pin embodiment it offers the advantage of permitting the pin to rotate on its axis when it is in a locked position. This makes it especially difficult for a thief to cut the pin or otherwise tamper with the pin to defeat the lock. In the case of the "J" pin embodiment this rotation allows the lock to be positioned around a variety of immobilizing objects at any angle. Any other rotatable configuration can be used as offering this advantage. It will be appreciated, however, that the pin could take on other configurations such as an oval cross section, square cross-section, or the like with or without this rotational feature.

This lock can be configured to attach to new bicycles as an original equipment part. In this case the bicycle frame may be adapted with braze-on fittings, holes and the like to mount the lock to seat stays, or the like. Alternatively and likely more commonly, the lock can be configured as an after-market accessory in which case it will provide the complete fixtures for affixing the two brackets to the bicycle frame.

Generally the lock is described in the "after market" configuration but the "original equipment" version as well.

In accordance with another aspect of the invention a bicycle lock includes a lock pin having a first end with a head and a second end, a receiving bracket and a locking bracket. In an embodiment well suited for after-market applications, the receiving bracket includes a first part, a second part and connecting means receivable in an opening in the first and second parts for connecting the first and second parts. The receiving bracket has a first through hole defined by recesses in the first and second parts, for mounting the locking bracket on a first frame part of a bicycle. A second through hole extends through the first part of the receiving bracket for inserting the lock pin. The locking bracket has a first part, a second part and connecting means for connecting the first part to the second part. The locking bracket also has a through hole defined by recesses in the first and second parts for mounting the locking bracket on a second frame part of a bicycle on an opposite side of a wheel from the first frame part. The connecting means in the locking and receiving brackets are unable to be removed when the lock pin is in a locked position. A blind hole is provided in the first part of said locking bracket for receiving the second end of said lock pin. A locking means is positioned within the locking bracket for engaging the lock pin and fixing the lock pin in a locked position.

According to another aspect of the invention a bicycle lock includes a lock pin with a first end and a second end, the first end of the lock pin being provided with a head and the second end being provided with a circumferential groove, a receiving bracket and a locking bracket. The receiving bracket has means (such as a first through hole) for mounting the receiving bracket on a first frame part of the bicycle and a second through hole perpendicular to the first through hole for inserting the lock pin. The locking bracket has means (such as a through hole) for mounting the locking bracket on a second frame part of the bicycle on an opposite side of the wheel from the first frame part, and a channel perpendicular to the through hole for receiving the second end of said lock pin. A locking means is positioned within the locking bracket for engaging the circumferential groove of the lock pin to fix the lock pin in a locked position relative to the locking bracket when the lock pin is positioned in the second through hole.

According to yet another aspect of the invention the bicycle lock of the type described herein can employ an elongated lock pin which has an extended portion, distal from the portion which spans the two brackets which extension additionally provides means for securing the lock, and the bicycle to which it is attached, to an immobilizing object such as a pole, fence, bicycle stand or parking meter. In one preferred embodiment of this aspect of the invention the means for securing the lock to an immobilizing object can take the form of an extension of the lock pin beyond the locking region which extension is shaped approximately into an open "U". This "U" on the end of the locking portion provides an overall "J" or "crook" shape to the locking pin with the curved part adapted so as to fit around the immobilizing object and draw the lock and bicycle toward the immobilizing object when the lock is locked in place. When the lock incorporates this extension for securing the lock and bicycle to an immobilizing object, this immobilizing can take place when the lock pin is fully engaged and locked in place between the receiving bracket and the locking bracket. This provides a double lock, in effect. One lock prevents the rear wheel of the bicycle from rotating and thus the bicycle from being ridden. The second prevents the bike from being carried off. When the pin includes this immobilizing extension, it is generally preferred if the curved portion of the extension be of a length and shape such that when the pin is locked in place the extension curves back upon itself at least to about the depth of the receiving bracket and preferably back to about the depth of the bicycle wheel rim or spokes. This assures that the "J" or "crook" portion together with the bicycle itself will fully surround the immobilizing object. This assures that the "J" or "crook" will not be easily dislodged from around the immobilizing object.

According to a yet further aspect of the bicycle lock the invention includes an elongated lock pin, a receiving bracket adapted to be mounted on a first frame part of the bicycle, and a locking bracket adapted to be mounted on a second frame part of the bicycle. The receiving bracket has a through hole and the locking bracket has a blinded hole or channel for receiving the lock pin. A locking means is provided for fixing the lock pin within the blinded channel in the locking bracket and thus also holding the pin in position in the through hole in the receiving bracket. The locking bracket and the receiving bracket each including a steel base portion completely surrounded by impact resistant reinforced plastic.

An additional aspect of the lock of this invention, which may be incorporated into any of the embodiments described herein, is the use of a key lock mechanism which is capable of carrying its key in a nonremovable state as long as the lock is not locked. This is a convenience feature which permits the key to be carried in the lock and only removed when the lock is locked in place.

A yet further feature which can be present in any of the lock embodiments described is a pin-holding fixture or bracket incorporated into either of the receiving or locking brackets to carry the locking pin when not in use. This fixture should hold the pin so as not to lose it while the bicycle is being ridden. Most commonly, this fixture holds the pin in a position substantially parallel to the frame member to which the bracket is attached.

BRIEF DESCRIPTION OF THE DRAWING FIGURES

The invention will be described in greater detail with reference to the accompanying drawings in which like elements bear like reference numerals, and wherein.

DETAILED DESCRIPTION OF THE PREFERRED EMBODIMENT

The present invention provides a bicycle lock for locking the front or rear bicycle wheel in position on the bicycle frame and preventing the wheel from rotating. In that way, the theft of the bicycle is unlikely to occur since the bicycle cannot be ridden. The bicycle lock is particularly useful in that it is designed to thwart attempts by would-be thieves to damage, destroy or otherwise remove the lock from the bicycle. The lock is unique in that it incorporates the frame of the bicycle in its structure as a strength-limiting component. This means that the frame prevents lock-defeating forces from being applied to the lock. In addition the preferred embodiment of the invention is made of a combination of light weight shock resistant plastic and metal to provide a strong and light weight lock.

Figure 1:
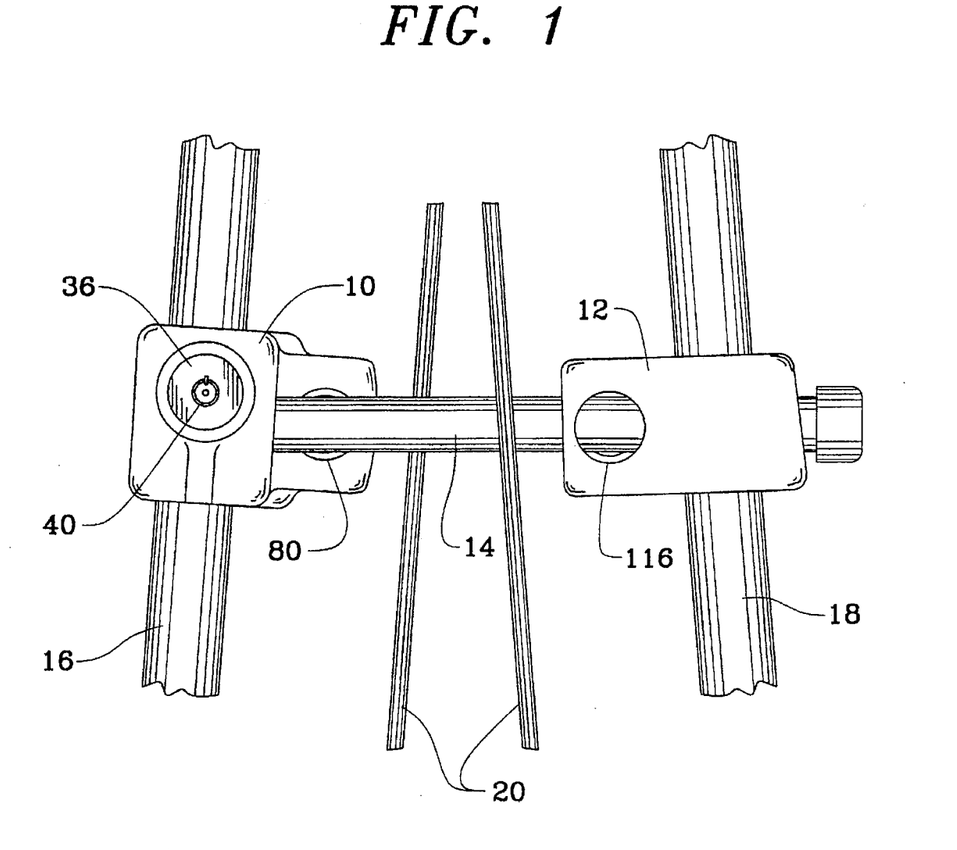
FIG. 1 is a front view of the bicycle lock, positioned on the frame of a bicycle.

The bicycle lock as shown in FIG. 1, includes a locking bracket 10, a receiving bracket 12 and a lock pin 14. The brackets 10, 12 are adapted to be positioned on first and second bicycle frame members 16, 18 respectively of the bicycle frame. In the locked position as shown in FIG. 1, the lock pin 14 is positioned in the two brackets 10, 12 and extends between the spokes 20 of the bicycle wheel. The bicycle lock may be positioned at the back wheel of the bicycle in which case the brackets 10, 12 are mounted on the two outwardly splayed seat stays on either side of the rear wheel. The lock may also be positioned at the front wheel of the bicycle in which case the brackets 10, 12 are mounted on the two fork members which support the front wheel of the bicycle.

Figure 2:
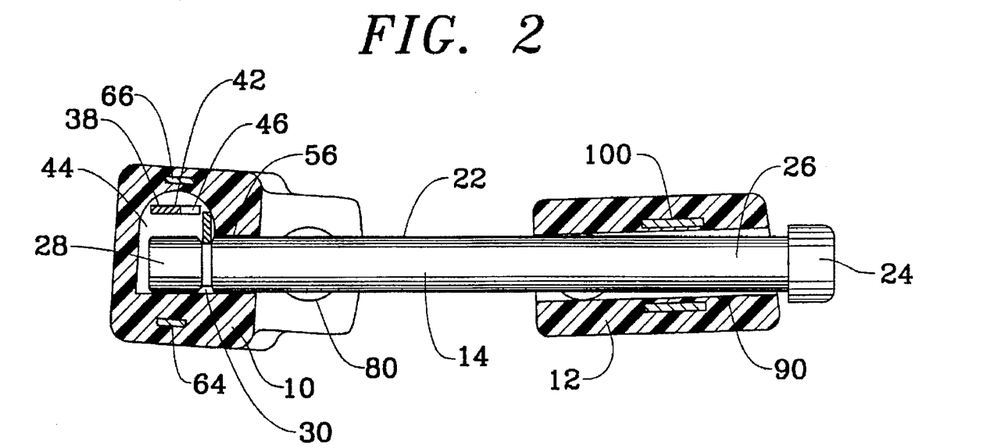
FIG. 2 is a partial front cross-sectional view of the lock shown in FIG. 1, taken along a section line parallel to the pin.
Figure 11:
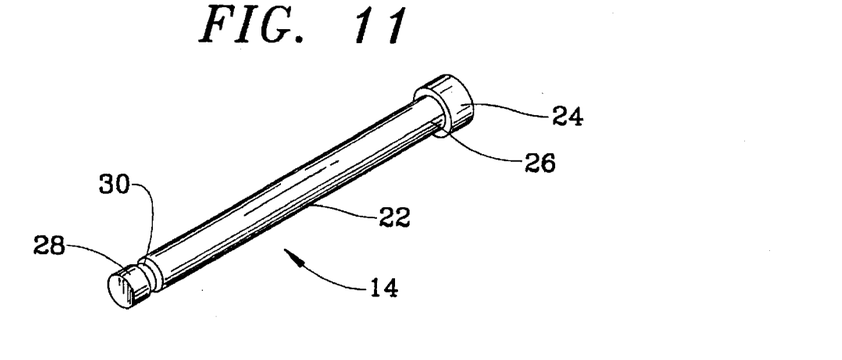
FIG. 11 is a top perspective view of one form of the lock pin.
Figure 13:
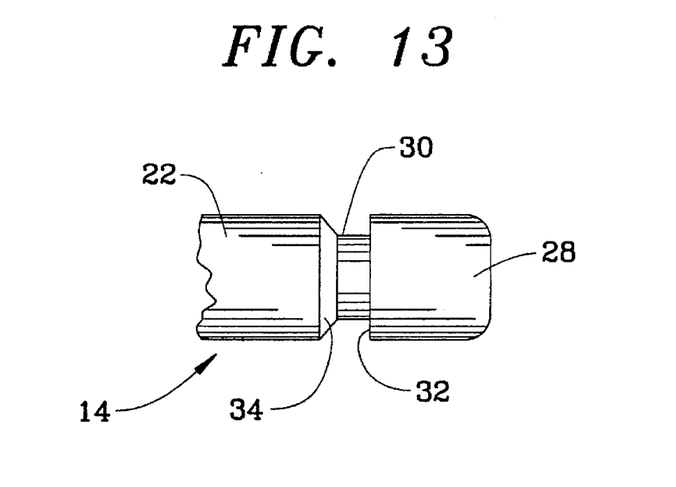
FIG. 13 is side view of the locking end of a lock pin.

As shown in FIGS. 1, 2 and 11, the lock pin 14 includes a first end 26, which may be provided with a head 24, and a second end 28. The head 24 may be provided with a knurled surface so that it may be easily gripped and removed from the locking bracket 10 when the bracket is unlocked. The shaft 22 has a circumferential groove 30 adjacent the second end 28 for engaging a locking mechanism within the locking bracket 10. The groove 30, as shown in FIG. 13, preferably has a first edge 32 which is perpendicular to the axis of the lock pin 14 and a second edge 34 which is inclined at an angle with respect to the lock pin axis. The lock pin 14 is preferably made of stainless steel or some other hardened metal which is not susceptible to being sawed through. However, it should be recognized that other equivalent materials can also be used.

As shown in FIG. 2, the locking bracket 10 is provided with a blind hole 56 for receiving the lock pin 14 and a locking mechanism for locking the lock pin in place. The locking mechanism includes a key actuated rotatable lock cylinder 36 (shown in FIG. 1) and a locking bar 38 attached to a lower portion of the rotatable lock cylinder. The locking bar 38 is planar and is oriented parallel to an axis of rotation of the rotatable lock cylinder 36. The key-actuated lock cylinder 36 has a substantially cylindrical keyhole 40 into which fits a cylindrical key (not shown). Rotation of the cylindrical key in the lock cylinder 36 results in rotary movement of the locking bar 38. This type of rotatable lock cylinder is known to those knowledgeable in lock technology. Also, it is to be understood that other commercially available lock cylinders can be used in place of the lock cylinder 36, including combination locks, key locks and the like, without effecting the operation of the bicycle lock.

As shown in FIG. 2, the locking bar 38 is moved from an unlocked position 42 in which the locking bar 38 is parallel to the axis of the lock pin 14, to a locked position 44 in which the bar is perpendicular to the lock pin 14 and engages the circumferential groove 30 in the lock pin 14. The locking bar 38 preferably has a semi-circular cut out portion 46 which conforms to the shape of the circumferential groove 30 in the lock pin 14 so that the locking bar 38 partially surrounds the lock pin 14 when the lock bar is in the locked position, thereby providing a secure lock. If, as is preferred, the pin has a cylindrical shape, it can be made to be rotatable on its axis when in the locked position. This is advantageous as far as minimizing tampering with the pin and lock by cutting or by the use of a pry bar or a wrench as it makes it difficult or impossible to get a decent purchase on the pin. If the lock has a "J" pin, this allows it to be fastened at any angle.

The locking bracket 10, as shown in FIGS. 3–6, includes a first bracket portion 48 and a second bracket portion 50. The first and second bracket portions 48, 50 are each provided with a semi-circular recess. The two recesses together define an opening 51 for attaching the locking bracket to the first bicycle frame member 16. A locking bracket bushing 52 which is shaped to fit within the opening 51 is provided between the bracket portions 48, 50 for frictionally engaging the first bicycle frame member 16. The bushing 52 is preferably made of polyurethane, however, it is to be understood that other materials which provide the required frictional fit would also be suitable. The first and second bracket portions 48 and 50 are attached to one another by connecting means such as one or more threaded bolts 54 with the bicycle frame member 16 being received within the opening 51.

Figure 6:
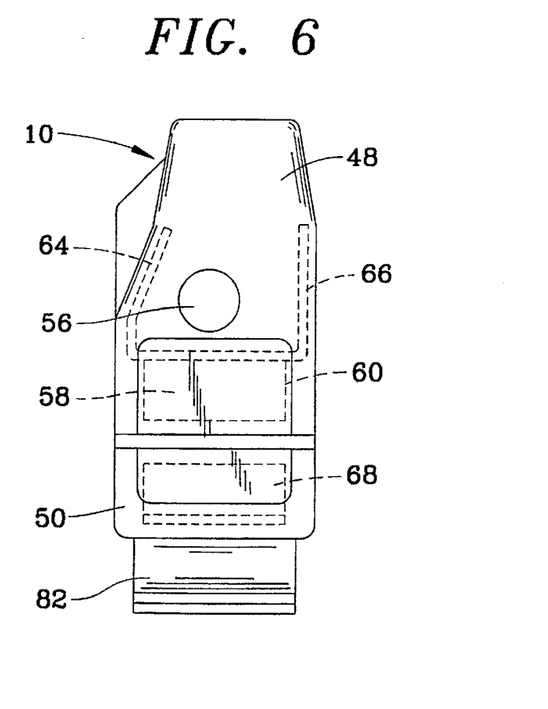
FIG. 6 is a side view of the locking bracket.
Figure 7:
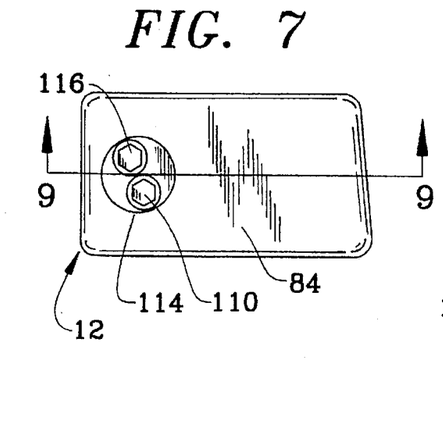
FIG. 7 is a front view of the receiving bracket of the bicycle lock.
Figure 8:
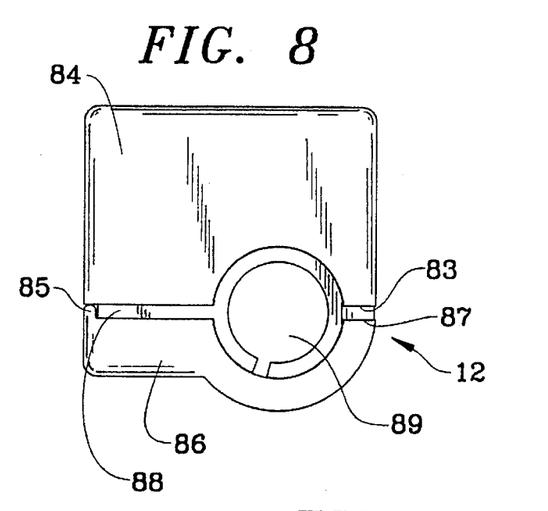
FIG. 8 is a top view of the receiving bracket of the bicycle lock.

The first and second bracket portions 48 and 50 are each fabricated of a metal insert surrounded by reinforced plastic to result in a relatively lightweight, yet extremely strong bicycle lock. In the first bracket portion 48, the metal insert 58 includes a C-shaped portion 60, a tail portion 62 having a hole, and two arms 64, 66 extending from a middle section of the C-shaped portion. The C-shaped portion 60 partially surrounds the recess which defines the opening 51. As shown in FIG. 6, the two arms 64, 66 and an upper surface of the C-shaped portion 60 partially surround the blind hole 56. Most commonly these metal-reinforced plastic parts are formed by injection molding of the plastic around the metal reinforcements.

The second bracket portion 50 of the locking bracket 10 includes metal insert 68 having a C-shaped portion 70 and a tail portion 72. The C-shaped portion 70 partially surrounds the recess which defines the opening 51. The tail 72 is provided with threaded cylindrical bores (one shown as 74) for receiving the threaded bolts 54.

Figure 3:
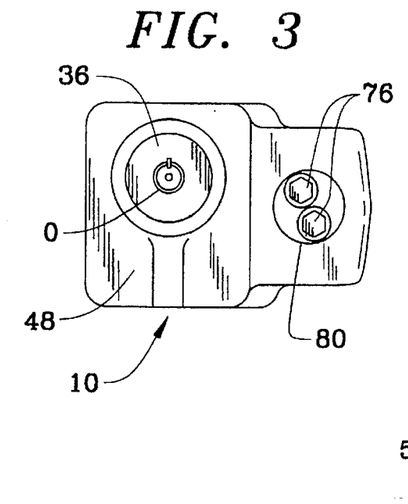
FIG. 3 is a front view of the locking bracket of the bicycle lock.
Figure 5:
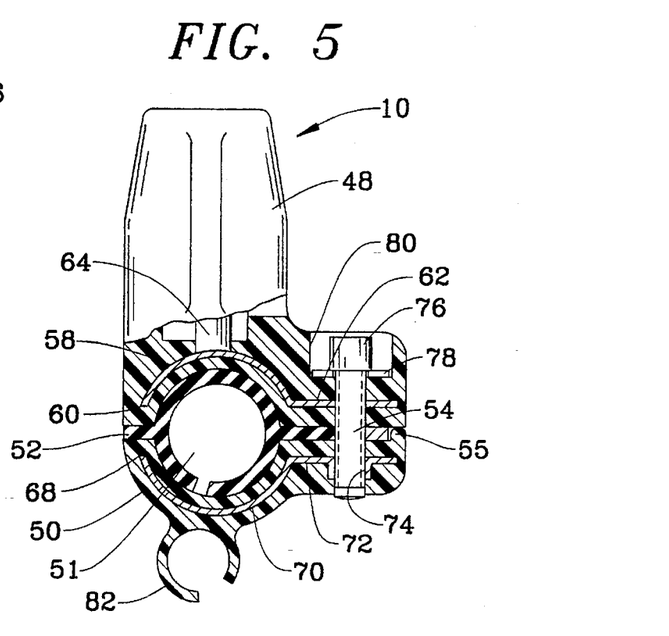
FIG. 5 is a partial cross-sectional top view of the locking bracket of FIG. 4.

As seen in FIG. 5 and mentioned above, the first and second bracket portions 48, 50 are securely connected to one another by the use of one or more threaded bolts 54. In the embodiment shown in FIG. 3 the two bolts are present. The heads 76 of the two bolts 54 and washers 78 are all positioned in a recess 80 in the first bracket portion 48. The bolts 54 are tightened securely in the threaded cylindrical bore 74 of the metal insert 68 to secure the two bracket portions 48, 50 together and prevent the locking bracket 10 from sliding on the first bicycle frame portion 16 as seen in FIG. 3. The heads 76 of the two bolts 54 can be designed to receive an allen wrench for purposes of tightening the bolts 54.

Also, it is to be noted that the axis of the blind hole 56 which receives the lock pin 14 extends immediately above the recess 80 that receives the bolt or bolts 54 and extends through an imaginary continuation of the inner wall surface defining the recess 80. As a result, when the lock pin 14 is positioned in the blind hole 56 in the locked position, as seen in FIGS. 1 and 2, access to the recess 80 which receives the connecting bolt or bolts 54 that connect the first and second bracket portions 48, 50 is blocked by the lock pin 14. As a result, the first and second bracket portions 48, 50 cannot be separated from one another when the lock pin 14 is in the locked position, thereby preventing removal of the locking bracket 10 from the bicycle frame.

Figure 4:
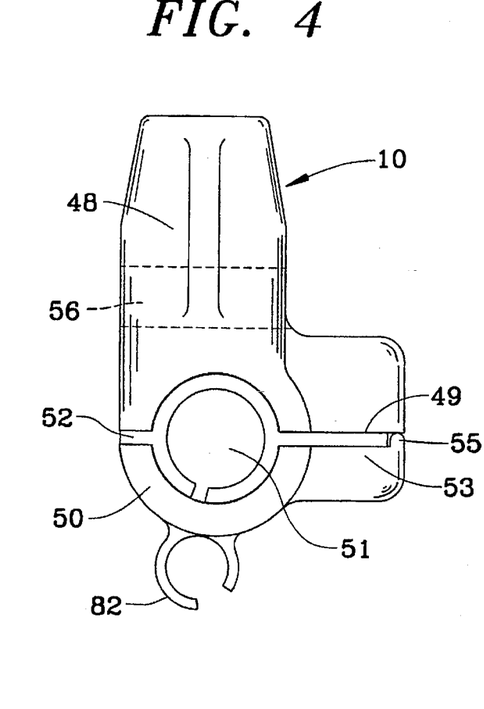
FIG. 4 is a top view of the locking bracket of the bicycle lock.

The second bracket portion 50 is also provided with a lock pin holder 82 for holding the lock pin in a position parallel to the first frame portion 16 when the lock is not in use. The lock pin holder 82 may be semi-circular, as shown in FIGS. 4 and 5, having an opening at both ends for inserting the lock pin 14. Alternatively, the lock pin holder may be in the form of a full circle.

The receiving bracket 12, as shown in FIGS. 7–10, includes a first bracket portion 84, a second bracket portion 86 and a bushing 88. The first and second bracket portions 84, 86 are each provided with a semi-circular recess which together define an opening 89 for attaching the receiving bracket 12 to the second bicycle frame member 18. The bushing 88 is configured to fit within the opening 89 between the recesses in the first and second bracket portions 84 and 86 for frictionally engaging the second bicycle frame member 18. The bushing 88, similar to the bushing 52 of the locking bracket, is preferably made of polyurethane.

Figure 9:
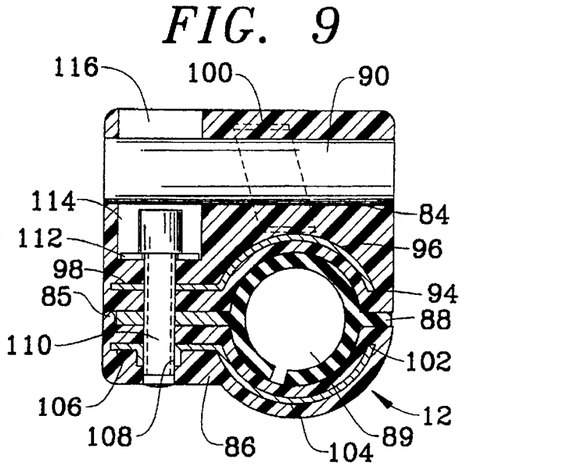
FIG. 9 is a cross-sectional top view of the receiving bracket of FIG. 8, taken along the section line 9—9 in FIG. 7.
Figure 10:
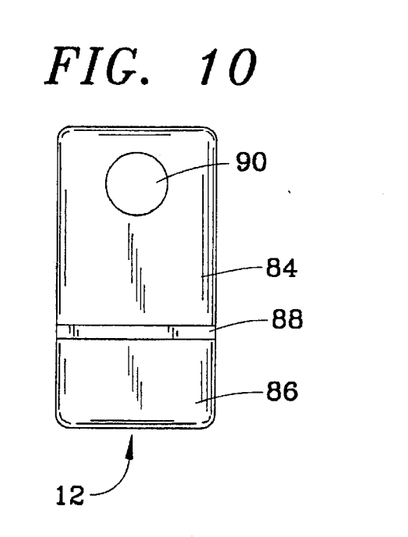
FIG. 10 is a side view of the receiving bracket.

The first bracket portion 84 of the receiving bracket 12, as shown in FIG. 9, is provided with a through hole 90 for receiving the first end 26 of the lock pin 14.

The first bracket portion 84 of the receiving bracket 12 has a metal insert 94 which includes a C-shaped portion 96, a tail portion 98 having a hole and a tubular portion 100. The C-shaped portion 96 partially surrounds the recess which forms the opening 89. The tubular portion 100 is preferably an elongated rectangular tube which is connected to an upper surface of the C-shaped portion 96 at the center of the C-shaped portion and extends around the channel 90.

The second bracket portion 86 of the receiving bracket 12 has a metal insert 102, shown in FIG. 9, which is substantially similar to the metal insert 68 of the locking bracket, shown in FIG. 5. The metal insert 102 includes a C-shaped portion 104 partially surrounding the recess which forms the opening 89 and a tail portion 106. The tail portion 106 is provided with one or more threaded cylindrical opening 108 for receiving one or more connecting member such as bolts 110.

Similar to the locking bracket 10, shown in FIGS. 3–6, the first and second bracket portions 84, 86 of the receiving bracket are connected by one or more bolts 110, with two bolts often given best results. The heads of the bolts 110 can be configured to be engaged by an allen wrench for purposes of tightening the bolts 110. The head of the bolts 110 and washers 112 are positioned in a recess 114 in the first bracket portion 84. The bolts 110 are accessible through an opening 116 in the side of the receiving bracket 12 which opens to the through hole 90. As can be seen from FIG. 9, the through hole 90 extends between and separates the opening 116 and the recess 114 which receives the bolts 110. In fact, the axis of the recess 114 intersects and extends through the through hole 90. Thus, when the lock pin 14 is in the locked position with the free end 28 positioned in the through hole 90, the bolt 110 is not accessible because the recess 114 is blocked by the lock pin 14. That is highly advantageous in that when the lock pin 14 is in the locked position, the bracket portions 84, 86 can not be disconnected from one another, thereby preventing unintended removal of the receiving bracket 12 from the bicycle frame.

In use, the bushings 52, 88 are positioned on the bicycle frame members 16, 18. Then the locking bracket 10 and the receiving bracket 12 are positioned over the bushings. The bolts 54, 110 are inserted into the threaded bores 74, 108 and tightened to secure the brackets to the respective frame members. It is to be noted that the bushings 52, 88 can be fabricated in different sizes or diameters. In that way it may be possible to use the same locking bracket and receiving bracket for frames of different sizes by simply utilizing a bushing of an appropriate thickness to suit the frame.

As seen in FIGS. 4 and 5, when the first and second bracket portions 48 and 50 are connected to one another they present generally parallel mating surfaces 49 and 53 respectively which come together and crush or compress bushing 52. Surfaces 49 and 53 may be flat or, as shown in FIGS. 4 and 5, may include a ridge 55 to provide a fulcrum parallel to the axis of cylindrical opening 51 to assist the tightening of lock bracket 10 around frame portion 16.

Ridge 55 can be on either surface 49 or 53. It typically has a height just slightly greater than the thickness of bushing 52 when bushing 52 is compressed or crushed in use. Although not specifically shown in the drawings it is generally advantageous, if a bushing tightening fulcrum like ridge 55 is provided, to cut away the bushing in the region adjacent to the fulcrum so that the ridge makes a hard contact with the opposing surface 49 or 53 when the lock is assembled and bushing 52 is compressed.

The same effect can be achieved in the receiving bracket 12 by having ridge 85 as a fulcrum between mating surfaces 83 and 87.

The lock pin 14 is inserted through the receiving bracket 12 and into the locking bracket 10. The rotatable lock cylinder 36 is then turned through use of an appropriate key until the locking bar 38 engages the groove 30 in the lock pin 14, to thereby secure the lock pin in the locked position. The second angled groove edge 34 on the lock pin 14 (shown in FIG. 13) helps to guide the locking bar 38 into the groove 30.

Figure 12:
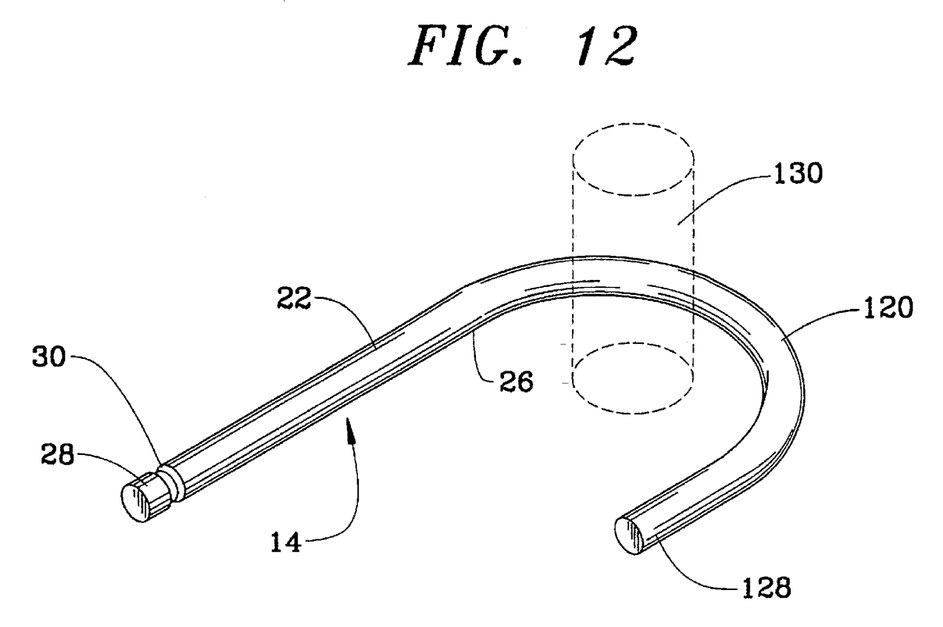
FIG. 12 is a top perspective view of an alternative form of lock pin, capable of connecting the lock to a fixed object.

As seen in FIG. 12, the lock pin 14 can have a shaft 22 which incorporates a second end 28 and a first end 26. Shaft 22 carries a locking groove 30 which is the groove which engages the locking mechanism when the pin 14 is fully inserted into the lock and locked. The first end 26 can be extended into an extension 120 which provides a "U" shape and an extended first end 128. This gives an overall "J" or "crook" shape to these embodiments of pin 14. This "J" shape can permit the extension 120 to loop around an object, such as a post or the like (shown in phantom as rod 130). When the lock pin 14 is locked in place, the distal end 128 of the extension 120 is pulled back adjacent to the locking bracket 10, so that the lock attaches the bicycle to immobilizing object 130. In this way the bicycle is double locked with pin 14 spanning brackets 10 and 12 as one lock and with extension 120 binding the bicycle to object 130 as the second lock. Because of the involvement of the bicycle frame in the lock structure any attempt to apply force to the "J" pin to force it off of the object 130 will apply force across the bicycle frame members. Since the bicycle lock is stronger than the frame this will discourage theft as the bicycle will not be valuable with a damaged frame.

When the lock is not in use, the lock pin 14 is placed in the holder 82 where it is securely held until the rider needs to lock the bicycle. In the case of a simple straight lock pin 14 as shown in FIG. 11 storage poses no problem and the pin can rotate in holder 82. When the lock pin 14 is extended and shaped, as shown in FIG. 12, it may be advantageous to provide the pin 14 and/or the holder 82 with means to arrest the rotation of the pin in holder 82. This prevents the crooked pin from turning and interfering with the rider as the bicycle is ridden. Although not shown in FIG. 13, rotation can be prevented by shaping the interior surface of holder 82 and the exterior surface of pin 14 to couple in one orientation. This can be done by adding a groove to one surface and a corresponding ridge to the other. Other equivalent structures can be used.

Quite advantageously, the brackets 10, 12 may be left mounted on the frame of the bicycle while the bicycle is being ridden.

It is also an advantage, if the locking mechanism employs a key, if that lock is selected from those locks which permit their keys to be immobilized in the lock when the lock is not locked. This offers the convenience of always having the key available when the locking bar is being locked in place.

From the forgoing, it should be readily apparent that the lock of the present invention is provided with several different attributes specifically designed to prevent the lock from being removed from the bicycle frame by a potential thief. When the lock pin 14 is in the locked position, the bolts 54, 110 which connect the bracket portions 48, 50, 84, 86 of the respective brackets 10, 12 to one another are blocked by the lock pin 14. Thus, a would-be thief cannot disassemble the lock by removing the brackets 10, 12 from the bicycle frame members 16, 18.

In addition, the blind hole 56 which receives the end 28 of the lock pin 14 covers and shields the end 28 of the lock pin 14. Consequently, a potential thief cannot access the end 28 of the lock pin 14 in an attempt to pry or pound loose the lock pin 14 from the locking bracket 12.

The brackets 10, 12 are preferably made of a lightweight yet durable plastic such as glass-reinforced nylon surrounding the metal inserts 58, 68, 94, 102 which are preferably made of heat-treated mild steel. The plastic portion is used for light weight and impact resistance and the metal is used for strength. The result is a bicycle lock which is not excessively heavy, yet which is capable of withstanding to a significant extent attempts to remove the lock from the bicycle frame by sawing and/or repeated impacts.

The plastic used for the brackets 10, 12 is an opaque plastic so that a thief cannot see where the metal inserts are located within the lock. That is quite helpful since the metal inserts 58, 68, 94, 102 prevent a thief from being able to saw through the plastic portion of the brackets. The metal inserts help protect various portions of the lock such as the regions around the frame members 16, 18, the areas between the frame members and the pin 14, and the portions between the bolts 54, 110 and the frame members.

The metal C-shaped insert portions 60, 70, 96, 104 help prevent the brackets 10, 12 from being sawed through and removed from the bicycle frame members 16 and 18. The arms 64, 66 attached to opposite sides of the C-shaped portion 60 and the loop 100 attached to a middle section of the C-shaped portion 96 prevent the lock from being removed by sawing between the frame members 16, 18 and the lock pin 14. The tail portions 62, 72, 98, 106 prevent the lock from being removed by sawing between the bolts 54, 110 and the frame members 16, 18 although the metal reinforced plastic brackets are light in weight.

The lock of the present invention has been described as a lock for a bicycle, however, it should be understood that the lock may be used on other bicycles which have frame members on either side of a wheel with spokes. For example, the invention may be used on motorcycles, mopeds, or tricycles.

While the invention has been described in detail with reference to a preferred embodiment thereof, it will be apparent to one skilled in the art that various changes and modifications can be made, and equivalents employed, without departing from the spirit and scope of the invention.

What is claimed is:

1. A bicycle lock for installation on a bicycle comprising:
   an elongated pin;
   a first bracket;
   first securing means for securing the first bracket to one of two outwardly splayed frame tubes of a bicycle at a point spaced from a rear axle of the bicycle and adjacent spokes of a rear wheel of the bicycle;
   a second bracket;
   second securing means for securing the second bracket to the other of the two frame tubes of the bicycle at substantially the same spacing from the rear axle as the first bracket;
   the first bracket having a first aperture for being positioned parallel to the rear axle of the bicycle when the lock is installed on a bicycle, the first aperture being sized to receive the elongated pin with said pin spanning between the two brackets and having an end received in a second aperture positioned in the second bracket;
   locking means in the second bracket for lockably engaging the pin to prevent removal of the pin from the second aperture, said locking means comprising a key-actuated rotatable lock with the key inserted perpendicular to said elongated pin;

the second aperture being blinded on an outer end to prevent access to the end of the pin which is secured in the second aperture when the pin is in locked engagement with the second bracket; and the elongated pin blocking access to the first securing means and the second securing means when the pin is in locked engagement with the second bracket with the first and second brackets including metal inserts surrounded by reinforced plastic, said metal inserts partially surrounding the first and second apertures.

2. The bicycle lock of claim 1 wherein the elongated pin is cylindrical.

3. The bicycle lock of claim 1 wherein the elongated pin has a first end and a second end distal from the first end and wherein the locking means in the second bracket engages the second end of the elongated pin.

4. The bicycle lock of claim 3 wherein the elongated pin has a cap on its first end.

5. The bicycle lock of claim 3 wherein the first end of the elongated pin extends outward beyond the first bracket and is adapted to engage an object when the bicycle is positioned adjacent thereto.

6. The bicycle lock of claim 3 wherein the first end of the elongated pin extends outward beyond the first bracket and is adapted to engage an object when the bicycle is positioned adjacent thereto and for lockably linking the lock to said object when the locking means is engaging the elongated pin.

7. The bicycle lock of claim 6 wherein the first end of the elongated pin which extends outward beyond the first bracket and is curved back upon itself in a crook shape.

8. The bicycle lock of claim 6 wherein the first end of the elongated pin which extends outward beyond the first bracket is curved back upon itself to a point at least about adjacent to the first bracket when the pin is lockably engaged by the locking means.

9. The bicycle lock of claim 6 wherein the elongated pin is "j" shaped.

10. The bicycle lock of claim 6 wherein the second end of the pin has a circumferential groove and wherein the locking means in the second bracket engages the groove when lockably engaging the pin.

11. The bicycle lock of claim 10, wherein the locking means additionally comprises a locking member provided on the rotatable lock which engages the circumferential groove.

12. The bicycle lock of claim 6 additionally comprising a pin holder present on the first bracket, the first securing means, the second bracket or the second securing means for holding the pin in an unlocked storage position.

13. The bicycle lock of claim 6 wherein the first securing means and the first bracket together have a first through hole defined by a recess in the first securing means and the first bracket with a bushing in the first through hole for frictionally receiving and gripping one of the two frame tubes, and wherein the second securing means and the second bracket together have a second through hole defined by a recess in the second securing means and the second bracket with a bushing in the second through hole for frictionally receiving and gripping the second of the two frame tubes.

14. The bicycle lock of claim 6, wherein the plastic is glass-reinforced nylon.

15. The bicycle lock of claim 1 wherein the elongated pin has a first end and a second end distal from the first end, the second end of the pin having a circumferential groove and wherein the locking means in the second bracket engages the groove when lockably engaging the pin.

16. The bicycle lock of claim 15, wherein the locking means additionally comprises a locking member provided on the rotatable lock which engages the circumferential groove.

17. The bicycle lock of claim 1 additionally comprising a pin holder present on the first bracket, the first securing means, the second bracket or the second securing means for holding the pin in an unlocked storage position.

18. The bicycle lock of claim 1 wherein the first securing means and the first bracket together have a first through hole defined by a recess in the first securing means and the first bracket with a bushing in the first through hole for frictionally receiving and gripping one of the two frame tubes, and wherein the second securing means and the second bracket together have a second through hole defined by a recess in the second securing means and the second bracket with a bushing in the second through hole for frictionally receiving and gripping the second of the two frame tubes.

19. A bicycle lock for installation on a bicycle comprising:

an elongated pin;

a first bracket;

first securing means for securing the first bracket to one of two outwardly splayed frame tubes of a bicycle at a point spaced from a rear axle of the bicycle and adjacent spokes of a rear wheel of the bicycle;

a second bracket;

second securing means for securing the second bracket to the other of the two frame tubes of the bicycle at substantially the same spacing from the rear axle as the first bracket;

the first bracket having a first aperture for being positioned parallel to the rear axle of the bicycle when the lock is installed on a bicycle, the first aperture being sized to receive the elongated pin with said pin spanning between the two brackets and having an end received in a second aperture positioned in the second bracket;

locking means in the second bracket for lockably engaging the pin to prevent removal of the pin from the second aperture, said locking means comprising a key-actuated rotatable lock with the key inserted perpendicular to said elongated pin;

the second aperture being blinded on an outer end to prevent access to the end of the pin which is secured in the second aperture when the pin is in locked engagement with the second bracket;

the elongated pin blocking access to the first securing means and the second securing means when the pin is in locked engagement with the second bracket;

the elongated pin being a cylindrical pin having an axis along its length and a first end and a second end, the second end of the pin having a circumferential groove and wherein the locking means in the second bracket engages the groove and permits the pin to rotate about this axis when the pin is in locked engagement with the second bracket;

with a pin holder present on the first bracket, the first securing means, the second bracket or the second securing means for holding the pin in an unlocked storage position parallel to one of the frame tubes, and wherein the pin, the first bracket and the second bracket are each constructed such that when the pin is spanning and engaging the two brackets and the two brackets are secured to the frame tubes of the bicycle, the combination of the pin, first bracket and second bracket is stronger than are the frame tubes to which the first and second brackets are secured and with the first and second brackets including metal inserts surrounded by reinforced plastic, said metal inserts partially surrounding the first aperture in the first bracket and the second aperture in the second bracket.

20. The bicycle lock of claim 19 wherein the first end of the elongated pin extends outward beyond the first bracket and is adapted to engage an object when the bicycle is positioned adjacent thereto and for lockably linking the lock to said object when the locking means is engaging the elongated pin.

21. The bicycle lock of claim 19, wherein the plastic is glass-reinforced nylon.

22. A bicycle lock mounted on a bicycle having a spoked wheel and a frame, the frame having a first frame tube and a second frame tube, said frame tubes being adjacent to the spoked wheel, the lock comprising:

an elongated pin;

a locking bracket adapted to be mounted on the first frame tube of said bicycle, said locking bracket having a blind hole for receiving the pin;

a receiving bracket adapted to be mounted on the second frame tube of said bicycle, said receiving bracket, having a through hole for receiving the pin so that the pin spans between the locking bracket and the receiving bracket, and extends through the spokes of the spoked wheel;

locking means for fixing the pin within the blind hole in the locking bracket while the pin is in the through hole in the receiving bracket, said locking means comprising a key-actuated rotatable lock with the key inserted perpendicular to said elongated pin;

said locking bracket and said receiving bracket each including a steel base portion completely surrounded by impact resistant reinforced plastic; and the elongated pin extending outward beyond the receiving bracket and adapted to engage an object when the bicycle is positioned adjacent thereto and for lockably linking the lock to said object when the locking means is fixing the elongated pin, and wherein the pin, the locking bracket and the receiving bracket are each constructed such that when the pin is spanning and engaging the two brackets and the two brackets are secured to the frame tubes of the bicycle, the combination of the pin, locking bracket and receiving bracket is stronger than are the frame tubes to which the locking and receiving brackets are secured.

23. The bicycle lock of claim 22, wherein the plastic is glass-reinforced nylon.

* * * * *